United States Patent
Faibish et al.

(10) Patent No.: US 9,910,742 B1
(45) Date of Patent: Mar. 6, 2018

(54) SYSTEM COMPRISING FRONT-END AND BACK-END STORAGE TIERS, DATA MOVER MODULES AND ASSOCIATED METADATA WAREHOUSE

(71) Applicant: EMC Corporation, Hopkinton, MA (US)

(72) Inventors: Sorin Faibish, Newton, MA (US); John M. Bent, Los Alamos, NM (US); James M. Pedone, West Boylston, MA (US); Sassan Teymouri, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 434 days.

(21) Appl. No.: 14/673,963

(22) Filed: Mar. 31, 2015

(51) Int. Cl.
| | |
|---|---|
| *G06F 7/00* | (2006.01) |
| *G06F 17/00* | (2006.01) |
| *G06F 11/14* | (2006.01) |
| *G06F 3/06* | (2006.01) |
| *G06F 17/30* | (2006.01) |

(52) U.S. Cl.
CPC ........ *G06F 11/1469* (2013.01); *G06F 3/0619* (2013.01); *G06F 3/0665* (2013.01); *G06F 3/0689* (2013.01); *G06F 11/1464* (2013.01); *G06F 17/30377* (2013.01); *G06F 2201/80* (2013.01); *G06F 2201/84* (2013.01)

(58) Field of Classification Search
CPC ................................................. G06F 17/30377
USPC .................................................. 707/692, 697
See application file for complete search history.

(56) References Cited

U.S. PATENT DOCUMENTS

2004/0250011 A1* 12/2004 Chen ...................... G11C 7/10
711/103
2009/0046386 A1* 2/2009 Evans ................ G11B 20/1207
360/48

(Continued)

OTHER PUBLICATIONS

J. Bent et al., "PLFS: A Checkpoint Filesystem for Parallel Applications," ACM Proceedings of the Conference on High Performance Computing Networking, Storage and Analysis (SC09), Nov. 2009, pp. 1-12.

(Continued)

*Primary Examiner* — Van Oberly
(74) *Attorney, Agent, or Firm* — Ryan, Mason & Lewis, LLP (57) ABSTRACT

An information processing system comprises a plurality of front-end storage tiers, a plurality of back-end storage tiers, a plurality of data mover modules arranged between the front-end and back-end file storage tiers, and a metadata warehouse associated with the data mover modules and the front-end and back-end storage tiers. The data mover modules are configured to control movement of data between the storage tiers. The metadata warehouse is configured to store for each of a plurality of data items corresponding metadata comprising movement information characterizing movement of the data item between the storage tiers. The movement information for a given data item illustratively comprises locations, timestamps and checksums for different stages of movement of the given data item. Other types of metadata for the given data item illustratively include lineage information, access history information and compliance information.

20 Claims, 4 Drawing Sheets

(56) References Cited

U.S. PATENT DOCUMENTS

| | | | | |
|---|---|---|---|---|
| 2012/0089782 A1* | 4/2012 | McKean | ............ | G06F 12/0804 |
| | | | | 711/122 |
| 2013/0282662 A1* | 10/2013 | Kumarasamy | .... | G06F 17/30289 |
| | | | | 707/649 |
| 2014/0101160 A1* | 4/2014 | Prahlad | ................ | G06F 3/0605 |
| | | | | 707/737 |
| 2015/0378628 A1* | 12/2015 | Golander | .............. | G06F 3/0607 |
| | | | | 711/162 |
| 2016/0259811 A1* | 9/2016 | MacKay | ........... | G06F 17/30174 |

OTHER PUBLICATIONS

Cluster File Systems, Inc., "Lustre: A Scalable, High-Performance File System," Nov. 2002, pp. 1-13.

F. Wang et al., "Understanding Lustre Filesystem Internals," National Center for Computational Sciences, Tech Report ORNL/TM-2009/117, Apr. 2009, pp. 1-80.

U.S. Appl. No. 14/138,297 filed in the name of S. Faibish et al. filed Dec. 23, 2013 and entitled "Cluster File System Comprising Data Mover Module Arranged Between Front-End and Back-End File Systems."

U.S. Appl. No. 14/499,429 filed in the name of S. Faibish et al. filed Sep. 29, 2014 and entitled "Cluster File System Comprising Data Mover Modules Having Associated Quota Manager for Managing Back-End User Quotas."

\* cited by examiner

SYSTEM COMPRISING FRONT-END AND BACK-END STORAGE TIERS, DATA MOVER MODULES AND ASSOCIATED METADATA WAREHOUSE

FIELD

The field relates generally to information processing systems, and more particularly to information processing systems that incorporate multiple storage tiers.

BACKGROUND

It is common in high-performance computing (HPC) systems and other information processing systems for multiple compute nodes to access a cluster file system. For example, HPC systems such as supercomputers typically include large numbers of compute nodes that access a parallel file system, distributed file system or other type of cluster file system. A cluster file system as the term is broadly used herein generally allows multiple compute nodes or other types of clients to share access to files over a network.

One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

For example, certain types of highly cost effective storage, such as scale-out network attached storage, are often seen as failing to provide performance characteristics that are adequate for use with supercomputers and other complex computing environments that utilize Lustre file systems.

Accordingly, despite the many advantages of Lustre file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide information processing systems that implement front-end and back-end storage tiers, a plurality of intermediate data mover modules and an associated metadata warehouse, so as to provide significant improvements relative to conventional arrangements.

In one embodiment, an information processing system comprises a plurality of front-end storage tiers, a plurality of back-end storage tiers, a plurality of data mover modules arranged between the front-end and back-end storage tiers, and a metadata warehouse associated with the data mover modules and the front-end and back-end storage tiers. The data mover modules are configured to control movement of data between the storage tiers. The metadata warehouse is configured to store for each of a plurality of data items corresponding metadata comprising movement information characterizing movement of the data item between the storage tiers. The movement information for a given data item illustratively comprises at least a subset of one or more locations, one or more timestamps and one or more checksums for each of a plurality of stages of movement of the given data item.

Additional information such as lineage information, access history information and compliance information for the given data item can additionally or alternatively be stored as metadata for that data item in the metadata warehouse.

As noted above, illustrative embodiments described herein provide significant improvements relative to conventional arrangements.

For example, one or more such embodiments can reduce the costs associated with archiving, backup, restoration and other types of movement of data while ensuring a high level of confidence in data validation by providing an ability to detect potential data integrity issues such as data corruption or data tampering.

The use of a metadata warehouse in a given embodiment provides a globally-accessible location for metadata relating to a given data item that may have multiple copies stored in respective distinct storage tiers. Also, the closest available copy can be easily determined and provided to a requesting entity without the need to traverse an entire hierarchy of data item stubs through a chain of storage tiers.

Other embodiments include, without limitation, methods, apparatus, systems, and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
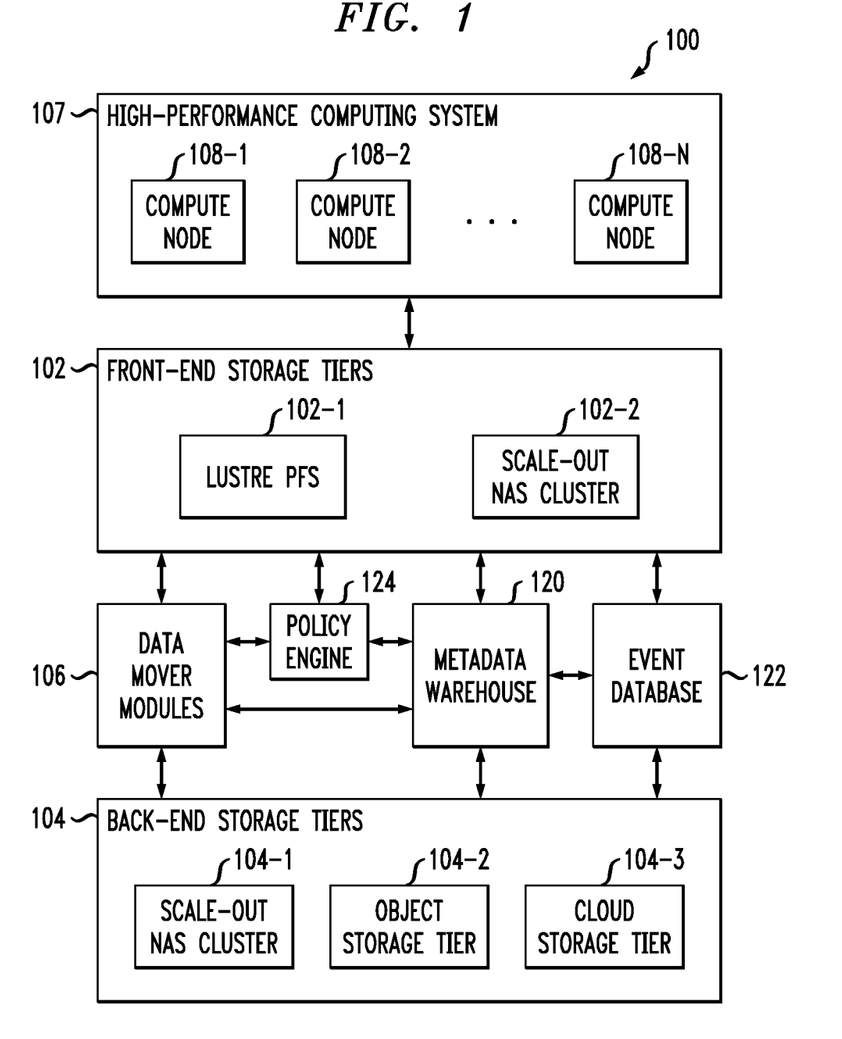
FIG. 1 is a block diagram of an information processing system comprising front-end and back-end storage tiers, data mover modules and an associated metadata warehouse in an illustrative embodiment of the invention.

FIG. 1 shows an information processing system 100 configured in accordance with an illustrative embodiment of the present invention. The information processing system 100 comprises front-end storage tiers 102, back-end storage tiers 104 and a plurality of data mover modules 106 arranged between the front-end and back-end storage tiers 102 and 104. The information processing system 100 further comprises an HPC system 107 comprising a plurality of compute nodes 108-1, 108-2, . . . 108-N. The compute nodes 108 of the HPC system 107 are coupled to the front-end storage tiers 102, but may additionally or alternatively be coupled to or otherwise associated with other system components in other embodiments. For example, in some embodiments, the data mover modules 106 can be implemented at least in part utilizing software running on the compute nodes 108.

The front-end file storage tiers 102 and back-end storage tiers 104 in the present embodiment collectively comprise multiple hierarchical storage tiers for use in hierarchical storage management (HSM). One or more of the storage tiers in each of the front-end and back-end storage tiers 102 and 104 may be associated with a distinct file system. For example, one or more of such tiers may be associated with a cluster file system. Numerous other types and arrangements of file systems can be used in implementing the front-end and back-end storage tiers in a given embodiment.

In the present embodiment, the front-end storage tiers 102 and back-end storage tiers 104 each include a plurality of distinct storage tiers of different types. More particularly, the front-end storage tiers 102 comprise a Lustre Parallel File System (PFS) storage tier 102-1 and a scale-out network attached storage (NAS) cluster storage tier 102-2. The back-end storage tiers 104 comprise a scale-out NAS cluster storage tier 104-1, an object storage tier 104-2 and a cloud storage tier 104-3. Numerous other types of storage tiers, as well as combinations of multiple types of storage tiers, can be utilized in implementing each of the front-end and back-end storage tiers 102 and 104. For example, the back-end storage tiers can comprise multiple object storage tiers and multiple cloud storage tiers. Also, in other embodiments it is possible to have only a single front-end storage tier or only a single back-end storage tier.

The data mover modules 106 in the present embodiment may be associated with an HSM quota manager, although such a quota manager is not explicitly shown in the figure. The data mover modules 106 may be configured, for example, to control archiving of data between the front-end storage tiers 102 and the back-end storage tiers 104 for respective users based at least in part on respective user quotas established by the quota manager and identifying corresponding portions of the back-end storage tiers 104 available to those users. Numerous other types of data movement relating, for example, to backup, restoration and other activities, can be controlled by the data mover modules 106 in a given embodiment.

The quota manager can be implemented internally to at least a given one of the data mover modules 106. The data mover modules 106 enforce the respective back-end user quotas established by the quota manager for the respective users. Although multiple data mover modules 106 are utilized in the present embodiment, it is possible in other embodiments to utilize only a single data mover module.

The "users" in this embodiment may refer, for example, to respective ones of the compute nodes 108, although the term "user" as utilized herein is intended to be broadly construed so as to encompass numerous other arrangements of human, hardware, software or firmware entities, as well as combinations of such entities.

The data mover modules 106 are illustratively configured to control archiving and other types of movement of data between the front-end storage tiers 102 and selected ones of the back-end storage tiers 104, possibly responsive to user quotas established by a quota manager for each of the back-end storage tiers 104.

The data mover modules 106 may be configured, for example, to archive a given file from a front-end file system associated with one or more of the front-end storage tiers 102 in a back-end file system associated with one or more of the back-end storage tiers 104 responsive to a link to that file being stored in a corresponding one of a plurality of archive directories of the front-end file system. Additionally or alternatively, files from the front-end file system can be configured for archiving in the back-end file system by storing the files themselves in the appropriate ones of the archive directories.

Such an arrangement is beneficial in that it provides a high degree of control over the particular types of files from the front-end file system that are archived in the back-end file system. For example, archiving of temporary files from the front-end file system in the back-end file system can be effectively prevented by preventing storage of the temporary files or links to the temporary files in the archive directories.

In operation, a given user can store links in its corresponding archive directory for only those files that are known to be needed later on. The user will not store links for scratch files and other temporary files, and as a result those files will not be archived and will not waste archive space. As noted above, the data mover modules 106 are configured to archive those files for which links to those files have been stored in the archive directories. Accordingly, there is no need to copy or move into the archive directory the actual files that need to be archived, as respective stored links for these files identify them to the data mover modules 106 as appropriate targets for archiving in the back-end file system.

The above-noted quota manager may be configured not only to establish the above-noted back-end user quotas, but also to establish archive directory quotas for respective ones of the archive directories. Moreover, the quota manager can proactively recommend changes to the archive directory quotas based on current sizes of the archive directories relative to the established archive directory quotas. Similar adjustments can be made to the back-end user quotas based on amounts of the respective allocated portions of the back-end file system that are currently being utilized by the corresponding users. For example, the back-end file system can be dynamically reallocated among the users by appropriate adjustment of the corresponding back-end user quotas.

The quota manager can be used to facilitate the provision of optimal HSM with selective archiving of files in the back-end file system. This helps to ensure that the allocated portions of the back-end file system are appropriately sized for their respective users, while also avoiding unnecessary archiving of scratch files or other temporary files that would otherwise waste archive space in the back-end file system. The allocated portions of the back-end file system can grow or shrink as needed to accommodate the changing requirements of the respective users. For example, the quota manager can proactively recommend increases or decreases in the archive space allocated to respective users, therefore ensuring that there will always be adequate space to archive desired application files.

Also, although the quota manager is configured to manage both back-end user quotas and archive directory quotas, this is by way of illustrative example only, and in other embodiments a given quota manager may instead be configured to manage only back-end user quotas or only archive directory quotas.

Additional details regarding exemplary quota managers suitable for use in embodiments of the present invention are disclosed in U.S. patent application Ser. No. 14/499,429, filed Sep. 29, 2014 and entitled "Cluster File System Comprising Data Mover Modules Having Associated Quota Manager for Managing Back-End User Quotas," which is incorporated by reference herein. It is to be appreciated, however, that the FIG. 1 embodiment and other illustrative embodiments herein can be implemented without the use of a quota manager of the type described above.

The information processing system 100 in the FIG. 1 embodiment further comprises a metadata warehouse 120 associated with the data mover modules 106 and the front-end and back-end storage tiers 102 and 104. The metadata warehouse is configured to store for each of a plurality of data items corresponding metadata comprising movement information characterizing movement of the data item between a given pair of tiers of the front-end and back-end storage tiers 102 and 104.

For example, the metadata warehouse 120 illustratively serves as a globally-accessible metadata repository for the data mover modules 106 within the system 100. This allows each data mover module to trace a given file, object or other data item as it moves through the front-end and back-end storage tiers 102 and 104. Accordingly, the data mover module as one illustration can move a given data item from the Lustre PFS storage tier 102-1 to the scale-out NAS cluster storage tier 102-2 to the object storage tier 104-2 and finally to the cloud storage tier 104-3. In conjunction with such movement between multiple storage tiers, the data mover module can eventually remove copies of the data item from the storage tiers 102-1, 102-2 and 104-2, leaving only the copy in the cloud storage tier 104-3. Upon receipt of a user request to restore the data item from the cloud storage tier 104-3 into the Lustre PFS storage tier 102-1 it can move the data item directly from the cloud storage tier into the Lustre PFS storage tier without having to traverse the entire hierarchy of data item stubs through the chain of storage tiers.

A given set of data mover modules 106 in a given embodiment can include data mover modules that support data movement via different types of interfaces. For example, some of the data mover modules may comprise POSIX-based data mover modules while others can comprise REST-based data mover modules, where POSIX denotes portable operating system interface and REST denotes representational state transfer. A more detailed example of such an arrangement will be described below in conjunction with FIG. 3. The metadata stored in the metadata warehouse 120 for a given data item supports this type of movement between distinct types of storage tiers possibly using different types of data mover module interfaces to the storage tiers. Additionally or alternatively, one or more of the data mover modules 106 can each support multiple distinct interfaces to different storage tiers.

The front-end and back-end storage tiers 102 and 104 or portions thereof may collectively comprise one or more data lakes of the system 100 for which corresponding metadata is stored in the metadata warehouse 120. The data items for which metadata is stored in the metadata warehouse 120 illustratively comprise, for example, respective files or objects, as well as multiple distinct portions of a particular file or object, or combinations of multiple files or objects. Accordingly, a wide variety of different types of data items can be accommodated in the system 100 with corresponding metadata comprising movement information characterizing movement of those data items being stored in the metadata warehouse 120.

The metadata warehouse 120 is referred to herein as a "warehouse" because in illustrative embodiments it provides a globally-accessible location within a given system for metadata characterizing movement of a given file, object or other data item across multiple distinct storage tiers of that system. The term "warehouse" as used herein is intended to be broadly construed to encompass these and other arrangements for storage of metadata relating to handling of a particular data item in multiple storage tiers.

The system 100 additionally includes an event database 122 and a policy engine 124. The event database 122 is coupled between the front-end and back-end storage tiers 102 and 104 and is also coupled to the metadata warehouse 120. The policy engine 124 is coupled to the front-end storage tiers 102 as well as to the data mover modules 106 and the metadata warehouse 120. It is to be appreciated that alternative configurations of the event database 122 and policy engine 124 are possible. For example, one or more of these components can be implemented at least in part within another system component, such as within one or more of the data mover modules 106 or within the metadata warehouse 120.

The event database 122 is illustratively configured to store information relating to events involving the plurality of data items for which corresponding metadata is stored in the metadata warehouse 120. These events can include, for example, one or more of creating the data item, accessing the data item, moving the data item, modifying the data item, renaming the data item, backing up the data item, archiving the data item and restoring the data item. Numerous additional or alternative events can be handled by the event database 122. At least a portion of the metadata stored for a given one of the data items comprises information derived at least in part from one or more events stored for that data item in the event database 122.

The policy engine 124 is associated with the data mover modules 106 and specifies one or more policies relating to movement of the data items between the storage tiers. Such movement of data items illustratively comprises movement of a given data item from one of the front-end storage tiers 102 to one of the back-end storage tiers 104 or vice versa. Additionally or alternatively, the movement of a given data item may comprise movement from one front-end storage tier to another front-end storage tier or from one back-end storage tier to another back-end storage tier.

The metadata warehouse 120 in some embodiments further stores for each of the plurality of data items corresponding checksum information utilizable to detect tampering with the data item and additional information sufficient to identify a particular one of the storage tiers 102 or 104 associated with any such detected tampering. The checksum information may be part of the above-noted movement information or may be considered separate information also stored in association with the corresponding data item in the metadata warehouse 120.

The metadata warehouse 120 additionally or alternatively stores for each of a plurality of data items one or more of lineage information for that data item, access history information for that data item and compliance information for that data item.

By way of example, the lineage information stored for a given one of the data items in the metadata warehouse 120 illustratively comprises actions taken on the given data item from its creation. Such actions may correspond to respective events for which corresponding event information has been captured by the event database 122.

The access history information stored for a given one of the data items in the metadata warehouse 120 illustratively comprises access statistics for the given data item within the storage tiers 102 and 104.

The compliance information stored for a given one of the data items in the metadata warehouse 120 illustratively comprises regulatory constraints on location of the data item within the storage tiers 102 and 104.

Like the lineage information, one or both of the access history information and the compliance information may be derived at least in part from events for which corresponding event information has been captured by the event database 122.

The metadata warehouse 120 is utilized in the present embodiment by one or more of the data mover modules 106 to identify, relative to specified access point for a given data item, a closest location of that data item from among multiple locations of respective copies of the given data item within respective ones of the storage tiers 102 and 104.

The movement information for a given one of the data items illustratively comprises at least a subset of one or more locations, one or more timestamps and one or more checksums for each of a plurality of stages of movement of the given data item between respective pairs of the storage tiers.

In some embodiments, a given one of the data items is split into a plurality of sub-items for storage in one or more of the storage tiers 102 and 104. The metadata stored for the given data item in the metadata warehouse 120 in such an embodiment illustratively comprises checksum information for the given data item in its entirety as well as separate checksum information for each of the sub-items of the given data item.

The FIG. 1 embodiment can be configured to provide support for a wide variety of different types of front-end and back-end storage tiers 102 and 104. For example, a given implementation can include multiple distinct cloud-based storage tiers as at least a subset of the back-end storage tiers 104, possibly implemented in geographically distributed locations using different storage products from different vendors. The metadata warehouse 120 stores metadata that facilitates the management of data items across such multiple storage tiers. For example, the metadata warehouse 120 can treat such multiple storage tiers as a data lake and can collect metadata that characterizes the movement of the data items among different portions of the data lake. This may involve synchronizing the stored metadata of the metadata warehouse 120 with metadata stored by each of the storage tiers. Moreover, the stored metadata of the metadata warehouse 120 can allow the system to validate a given data item in conjunction with its retrieval from one of the storage tiers in order to ensure that the data item has not been corrupted or otherwise tampered with by attackers.

A given data item can be retrieved, for example, from a cloud storage tier of the back-end storage tiers 104 directly into one of the front-end storage tiers 102. Such a data item can be represented by a stub in the front-end storage tier that points to the corresponding stored metadata in the metadata warehouse 120 and a given one of the data mover modules 106 can utilize that metadata in conjunction with moving the data item from the back-end cloud storage tier into a front-end storage tier.

In one possible example of an arrangement of this type, the data item is replaced with a stub that points to the metadata warehouse 120 and not to any back-end copy of the data item. As a result, one or more corresponding stubs relating to the data item in other tiers will also point to the metadata warehouse 120 and the data mover modules will be able to go directly to the metadata warehouse in order to determine where to access the closest copy of the data item. As a more particular example, when a user wants to access a file in the Lustre PFS 102-1, a Lustre metadata server (MDS) will call a corresponding data mover module which will go to the metadata warehouse 120 to retrieve the file location and type of access.

The metadata warehouse 120 is accessible to the data mover modules 106 and utilized by those modules in moving data items between the various storage tiers 102 and 104 of the system 100. The policy engine 124 operating in conjunction with stored metadata can be used to ensure that a given data item is restored from its closest backup version. Additionally, the metadata stored in the metadata warehouse 120 allows the data mover modules 106 to make intelligent decisions regarding the locations of archive or backup copies of a given data item such as ensuring that the sensitive data items are stored only in private clouds or other suitably secure storage tiers. Also, the metadata can indicate for a given data item the corresponding risks in the event the data item is corrupted or lost or falls in the hands of hackers in clouds located in unfriendly blacklisted countries.

Additional details regarding exemplary metadata warehouse functionality will be described below in conjunction with the illustrative embodiments of FIGS. 2 and 3.

The front-end storage tiers 102 in some embodiments are configured to include at least one HSM API for communicating with one or more of the data mover modules 106. Such an API may comprise a Lustre HSM API of the type implemented in version 2.5 of the Lustre file system, although other types of HSM APIs may be used in other embodiments.

Through such an HSM API, a given one of the data mover modules 106 may be provided with information that allows it to control archiving, backing up, restoring and other movement of data between front-end and back-end storage tiers.

By way of example, a given one of the data mover modules 106 may be configured in the form of a multi-threaded application that communicates with a corresponding HSM API of the front-end storage tiers 102. The information received in the given data mover module via the HSM API illustratively comprises commands to move files from the front-end storage tiers 102 to the back-end storage tiers 104 and to restore files from the back-end storage tiers 104 to the front-end storage tiers 102. In other embodiments, the front-end storage tiers 102 need not include any HSM APIs, and can instead utilize other types of interfaces for communicating with the data mover modules 106.

The term "data movement" as used in this and other contexts herein is intended to be broadly construed, so as to encompass data migration as well as other types of movement of data between storage tiers, including various types of data movement that may be associated with the above-described archiving, backing up and restoring of data between the front-end storage tiers 102 and the back-end storage tiers 104.

Conventional aspects of Lustre file systems suitable for use in implementing one or more of the front-end storage tiers 102 are described in, for example, Cluster File Systems, Inc., "Lustre: A Scalable, High-Performance File System,"

November 2002, pp. 1-13, and F. Wang et al., "Understanding Lustre Filesystem Internals," Tech Report ORNL/TM-2009/117, April 2010, pp. 1-95, which are incorporated by reference herein.

Scale-out NAS cluster tiers of the front-end and back-end storage tiers 102 and 104 and other scale-out NAS clusters referred to herein may be implemented, for example, using Isilon® storage platforms, such as storage platforms comprising Isilon® platform nodes and associated accelerators in the S-Series, X-Series and NL-Series product lines, commercially available from EMC Corporation of Hopkinton, Mass.

Other types of storage products that may be used to implement portions of one or more of the storage tiers 102 and 104 of the system 100 include storage arrays such as VNX® and Symmetrix VMAX®, both also commercially available from EMC Corporation. A variety of other storage products may be utilized to implement at least a portion of a front-end or back-end storage tier or associated file system.

The data mover modules 106 are adapted for communication with the front-end storage tiers 102, possibly via HSM APIs of the type noted above. For example, a given one of the data mover modules 106 may be configured to control movement of data between the front-end storage tiers 102 and the back-end storage tiers 104 responsive to information received via a corresponding one of the HSM APIs.

The movement of data may include, for example, movement of data between at least one of the OSS tiers and one or more of the scale-out NAS cluster tiers, and may additionally or alternatively involve movement of data between multiple OSS tiers or between multiple scale-out NAS cluster tiers.

The different storage tiers in a given set of multiple storage tiers in this embodiment illustratively comprise different types of storage devices having different performance characteristics. For example, each of a plurality of OSS servers of a given one of the OSS tiers is illustratively configured to interface with a corresponding OST in the form of a flash storage device, and each of the scale-out NAS nodes of a given one of the scale-out NAS storage tiers comprises a disk storage device.

The flash storage devices of the given OSS tier are generally significantly faster in terms of read and write access times than the disk storage devices of the given scale-out NAS cluster tier. The flash storage devices are therefore considered "fast" devices in this embodiment relative to the "slow" disk storage devices. Accordingly, the hierarchical storage management may be characterized in the present embodiment as having one or more "fast" storage tiers and one or more "slow" storage tiers, where "fast" and "slow" in this context are relative terms and not intended to denote any particular absolute performance level. However, numerous alternative tiering arrangements may be used, including arrangements with three or more tiers each providing a different level of performance. The particular storage devices used in a given storage tier may be varied in other embodiments, and multiple distinct storage device types may be used within a single storage tier.

The flash storage devices may be implemented, by way of example, using respective flash Peripheral Component Interconnect Express (PCIe) cards or other types of memory cards installed in a computer or other processing device that implements the corresponding OSS. Numerous alternative arrangements are possible. Also, a variety of other types of non-volatile or volatile memory in any combination may be used in place of the flash storage devices. Examples of alternatives to flash storage devices that may be used as respective OSTs or as other types of storage system elements in other embodiments of the invention include non-volatile memories such as magnetic random access memory (MRAM) and phase change random access memory (PC-RAM).

The flash storage devices of the given OSS tier generally provide higher performance than the disk storage devices of the given scale-out NAS cluster tier but the disk storage devices generally provide higher capacity at lower cost than the flash storage devices. The exemplary tiering arrangement using one or more OSS tiers and one or more scale-out NAS cluster tiers therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the system 100, leading to enhanced system performance relative to conventional arrangements, while additionally or alternatively providing an ability to achieve particular levels of performance at lower cost.

Also, such an arrangement allows the system 100 to obtain the performance advantages of an OSS storage tier as well as the storage capacity and cost benefits associated with use of scale-out network attached storage. Accordingly, implementation of scale-out network attached storage is facilitated in supercomputers and other complex computing environments that utilize Lustre file systems.

In the FIG. 1 embodiment, as in other embodiments described herein, an OSS tier is also referred to as a "fast" storage tier and a scale-out NAS cluster tier is also referred to as a "slow" storage tier. Again, the terms "fast" and "slow" in this context are relative terms and should not be construed as requiring any particular absolute performance levels.

These particular tiering arrangements should be considered exemplary only, and numerous alternative arrangements of storage tiers may be utilized in providing one or more front-end storage tiers 102 and one or more back-end storage tiers 104 in other embodiments. For example, additional or alternative arrangements of storage tiers may be implemented utilizing one or more burst buffer appliances.

A given such burst buffer appliance is generally configured to accelerate IO operations between the compute nodes 108 and the front-end storage tiers 102 by storing associated data in its burst buffers. The term "burst buffer appliance" as used herein is intended to be broadly construed, so as to encompass any network appliance or other arrangement of hardware and associated software or firmware that collectively provides multiple burst buffers implemented using high-speed storage devices.

Thus, a burst buffer appliance may be viewed as providing a high-speed memory that serves as a buffer between the compute nodes 108 of the HPC system 107 and a front-end file system, for storing bursts of data associated with different types of IO operations.

Other embodiments may include multiple burst buffer appliances, with each such appliance adapted for coupling between at least a portion of a front-end file system and one or more compute nodes 108 of the HPC system 107.

In still further embodiments, one or more burst buffer appliances may be incorporated into the front-end storage tiers 102 and utilized to implement at least a portion of the one or more of those storage tiers.

It is also to be appreciated that the use of Lustre file systems is not a requirement of the illustrative embodiments, and numerous additional or alternative file systems can be used in implementing at least portions of one or more of the front-end and back-end storage tiers 102 and 104. For example, file systems such as Hadoop Distributed File System (HDFS), General Parallel File System (GPFS), Network File System (NFS), PanFS and numerous others can be used, possibly in combination with a Lustre file system or other types of object stores such as EMC Atmos or Ceph. Various other combinations of these and other file systems can also be used in other embodiments.

As indicated above, portions of a cluster file system may be implemented as a distributed file system such as HDFS, a parallel file system such as GPFS or as a combination of a Lustre file system with HDFS, GPFS or other parallel or distributed file systems. The term "cluster file system" as used herein is therefore intended to be broadly construed, so as to encompass a wide variety of different file systems that can be shared by clusters of compute nodes, as well as various combinations of such file systems.

The HPC system 107 may comprise, for example, a supercomputer. Such an HPC system is an example of what is more generally referred to herein as a "computer system." Each of the compute nodes 108 may comprise or otherwise correspond to one or more clients of the information processing system 100.

Accordingly, one or more clients may be implemented as respective components of each of the compute nodes 108. The term "client" as used herein is therefore intended to be broadly construed, so as to encompass, for example, a compute node or a component thereof. Such a component may be implemented in software, and therefore a "client" as the term is utilized herein may comprise a software component associated with one of the compute nodes 108 of the HPC system 107.

The data mover modules 106 may be configured to control movement of data between the front-end and back-end storage tiers 102 and 104 in order to facilitate achievement of desired levels of performance by the clients.

The data mover modules 106 are illustratively shown as being implemented externally to the HPC system 107 in the present embodiment, but in other embodiments can be implemented at least in part on the compute nodes 108.

Numerous other types and arrangements of cluster file systems and computer systems may be used in other embodiments of the invention.

Although some embodiments utilize one or more burst buffer appliances in the front-end storage tiers 102, or coupled between the front-end storage tiers 102 and the compute nodes 108 of the HPC system 107, use of burst buffer appliances is optional and may be eliminated in other embodiments.

As indicated above, the data mover modules 106 control movement of data between storage tiers of the front-end and back-end storage tiers 102 and 104, taking into account current operating conditions and other factors, possibly based at least in part on information received via HSM APIs of the front-end storage tiers 102.

Data movement determinations made by the data mover modules 106 are illustratively performed in cooperation with one or more job schedulers of the information processing system 100. For example, data movement determinations can be made at least in part utilizing a job scheduler of the system 100 responsive to IO requests received in the job scheduler from one or more applications running on the compute nodes 108. Such IO requests and other similar requests referred to herein may be configured, for example, in accordance with standard POSIX system calls. Data movement determinations can be implemented differently for each of a plurality of processing jobs, thereby effectively allowing dynamic data migration on a per-job basis.

The data mover modules 106 can also be configured to update stored metadata responsive to movement of data between the storage tiers 102 and 104. As indicated previously, such metadata illustratively comprises movement information for respective ones of a plurality of data items and is stored in the metadata warehouse 120.

The data mover modules 106 in some embodiments each comprise a plurality of server nodes that are synchronized with one another utilizing a message passing interface (MPI) protocol. The server nodes can be implemented using the compute nodes 108, or other arrangements of one or more processing devices, including, for example, one or more processing devices that are each coupled to the front-end storage tiers 102, the back-end storage tiers 104 and the HPC system 107. A data mover module arrangement of this type is considered an example of an embodiment in which the data mover module is arranged between the front-end and back-end storage tiers. In other words, additional coupling or other association of a given one of the data mover modules 106 with the HPC system 107 does not prevent the data mover module from being effectively arranged between the front-end storage tiers 102 and the back-end storage tiers 104.

One or more of the data mover modules 106 in some embodiments are each configured to split a given file received from one of the front-end storage tiers 102 into multiple smaller files for storage in one of the back-end storage tiers 104 and to associate with each of the smaller files a corresponding file extension from a designated namespace so as to permit the given file to be reconstructed upon retrieval of the smaller files from the back-end storage tier. Such file-splitting effectively allows a Lustre-based implementation of a given one of the front-end storage tiers 102 to utilize Isilon® platform nodes or other types of scale-out NAS clusters as HSM targets, thereby providing enhanced flexibility in storage tiering and a better balance between performance and cost in the information processing system 100.

This is in contrast to conventional practice, where scale-out NAS clusters that have file size limitations often cannot be used as a Lustre file system HSM target, because the Lustre file system often has file sizes well above the file size limitations of the scale-out NAS clusters. For example, some Isilon® platform nodes have file size limits of only 4 terabytes (TB), while Lustre file systems often store files with sizes on the order of 10-50 TB or more.

Accordingly, under this conventional practice, it is not possible to utilize Isilon® platform nodes as HSM targets of a Lustre file system. Embodiments of the present invention advantageously overcome this significant deficiency of conventional practice, thereby allowing Isilon® platform nodes, other scale-out NAS cluster nodes and other types of back-end storage tiers to be used as HSM targets.

Similar advantages are obtained using alternative implementations of the data mover modules 106. For example, in other embodiments, each data mover module is implemented at least in part utilizing a virtual layer of a parallel log-structured file system (PLFS). In such an embodiment, the virtual layer may comprise PLFS middleware configured to migrate files between the front-end and back-end storage tiers.

Although the data mover modules 106 are illustratively shown as being separate from the storage tiers 102 and 104 in the figure, components such as the PLFS middleware may be implemented using OSSs of one or more OSS tiers as well as scale-out NAS nodes of one or more scale-out NAS cluster tiers. For example, one or more of the front-end and back-end storage tiers 102 and 104 may be viewed as implementing a corresponding virtual layer of PLFS functionality within the cluster file system of the information processing system 100.

A given such PLFS virtual layer represents at least a portion of what is more generally referred to herein as a virtual file system. It should be understood that other types of virtual file systems can be used to implement at least a portion of the data mover modules 106 in other embodiments.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that PLFS is not a requirement of any particular embodiment.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the front-end storage tiers 102, the back-end storage tiers 104, the data mover modules 106, the HPC system 107 comprising compute nodes 108, the metadata warehouse 120, the event database 122 and the policy engine 124 may be implemented using one or more processing platforms, examples of which will be described in greater detail below in conjunction with FIGS. 4 and 5. A given such processing platform comprises at least one processing device comprising a processor coupled to a memory, and the processing device may be implemented at least in part utilizing one or more virtual machines or other types of virtualization infrastructure such as Docker containers.

Although shown in FIG. 1 as being separate from the front-end storage tiers 102, back-end storage tiers 104 and compute nodes 108, the data mover modules 106 in other embodiments may be implemented at least in part within one or more of these system elements. It is also to be appreciated that a given embodiment of the information processing system 100 may include multiple instances of one or more of the set of front-end storage tiers 102, the set of back-end storage tiers 104, the set of data mover modules 106 and the HPC system 107 comprising the set of N compute nodes 108, although only a single instance of each of these sets is shown in the system diagram for clarity and simplicity of illustration.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 206, and is suitable for use in the system 100 but is more generally applicable to other systems comprising one or more data mover modules arranged between at least one front-end storage tier and at least one back-end storage tier and having an associated metadata warehouse.

In step 200, data mover modules are configured for arrangement between front-end and back-end storage tiers. With reference to the FIG. 1 embodiment, the data mover modules 106 are implemented between the front-end storage tiers 102 and the back-end storage tiers 104. The data mover modules 106 in the FIG. 1 embodiment are not shown as being directly coupled to the HPC system 107. However, in other embodiments, the data mover modules are implemented at least in part on the compute nodes 108 themselves, for example, using PLFS clients running on respective ones of the compute nodes.

In step 202, a metadata warehouse associated with the data mover modules and the front-end and back-end storage tiers is provided. In the context of the FIG. 1 embodiment, metadata warehouse 120 is arranged between the front-end and back-end storage tiers 102 and 104 and coupled to the data mover modules 106, event database 122 and policy engine 124, although it is to be appreciated that numerous alternative configurations and arrangements of the metadata warehouse 120 are possible.

In step 204, the data mover modules are utilized to control movement of data between the front-end and back-end storage tiers. As mentioned previously, such movement of data illustratively comprises movement of a given data item from one of the front-end storage tiers 102 to one of the back-end storage tiers 104 or vice versa. Additionally or alternatively, the movement of data between storage tiers may comprise movement of a given data item from one front-end storage tier to another front-end storage tier or from one back-end storage tier to another back-end storage tier. The term "movement" as used herein with regard to movement of data or particular data items is therefore intended to be broadly construed, so as to encompass these and other various types of data movement that are possible in the system 100.

In step 206, the metadata warehouse stores for each of a plurality of data items corresponding metadata comprising movement information characterizing movement of the data item between the storage tiers 102 and 104. Again, such movement of a given data item can be between two distinct storage tiers of the front-end storage tiers 102, between two distinct storage tiers of the back-end storage tiers 104 or between one of the storage tiers 102 and one of the storage tiers 104.

The movement information for a given one of the data items illustratively comprises at least a subset of one or more locations, one or more timestamps and one or more checksums for each of a plurality of stages of movement of the given data item between respective pairs of the storage tiers.

At least portions of the metadata for a given data item can be stored as an extended inode attached to or otherwise associated with the data item.

The storing of metadata in step 206 may involve utilization of event information stored in the event database 122 and relating to events involving the plurality of data items. In such an arrangement, at least a portion of the metadata stored in the metadata warehouse is generated for a given one of the data items utilizing information derived from one or more of the events associated with the given data item. Examples of such events associated with the given data item may include one or more of creating the data item, accessing the data item, moving the data item, modifying the data item, renaming the data item, backing up the data item, archiving the data item and restoring the data item.

As indicated previously, in conjunction with the movement of data between a pair of storage tiers of the front-end and back-end storage tiers 102 and 104, a given one of the data mover modules 106 may split a given file received from the one of the storage tiers into multiple smaller files for storage in another one of the storage tiers. For example, such splitting may be necessary due to file size restrictions in the nodes of the scale-out NAS cluster tiers of the front-end and back-end storage tiers 102 and 104.

If a given file from one of the storage tiers is split for storage in another one of the storage tiers, the particular one of the data mover modules 106 controlling that movement associates with each of the smaller files a corresponding file extension from a designated namespace so as to permit the given file to be reconstructed upon retrieval of the smaller files from the corresponding storage tier.

Similar splitting arrangements may be applied to file segments representing respective portions of a given file. For example, a given file may be stored in an OSS tier as multiple segments with each segment residing in a different OST of the OSS tier. The segments in such an arrangement may each be split for storage in the nodes of a scale-out NAS cluster tier, again depending on the segment size relative to the file size restrictions associated with the scale-out NAS nodes.

Also, in conjunction with splitting of files or file segments, one or more metadata files are also generated and stored in the back-end storage tiers 104. For example, a given metadata file may indicate the manner in which split files or split file segments are distributed across multiple nodes of a given scale-out NAS cluster tier. Such metadata is also assumed to be stored in the metadata warehouse.

It should be noted that file segments and sub-segments are intended to fall within the general term "file" as broadly used herein. Such segments and sub-segments are identified by unique file names using file extensions from a designated namespace.

The manner in which a given file is stored across the nodes of the scale-out NAS cluster tier will generally depend upon the file size. For example, in an arrangement in which the given file is stored as multiple file segments across respective multiple OSTs of an OSS tier, the layout of the file segments over the OSTs can be preserved in the back-end storage tiers 104 if the sizes of the file segments are less than or equal to the maximum file size permitted in the nodes of a scale-out NAS cluster tier.

A round robin distribution of the file segments across the scale-out NAS cluster nodes can be used. Thus, for example, if there are three scale-out NAS cluster nodes A, B and C and six file segments denoted SF0, SF1, SF2, SF3, SF4 and SF5, file segments SF0 and SF3 are stored on scale-out NAS cluster node A, file segments SF1 and SF4 are stored on scale-out NAS cluster node B, and file segments SF2 and SF5 are stored on scale-out NAS cluster node C, in accordance with the round robin distribution. The file layout is reflected in metadata stored in a corresponding metadata file which may be archived within the back-end file system and also stored in the metadata warehouse. Other types of distributions of file segments can be used in other embodiments.

If the file segments stored on the respective Lustre OSTs are larger than the maximum file size permitted in the nodes of the scale-out NAS cluster tier, the file segments can each be split into two or more sub-segments that satisfy the file size limitations of the scale-out NAS cluster nodes. Again, round robin distribution or other types of distribution can be used in storing the sub-segments over the scale-out NAS cluster nodes.

It was noted above that data stored in the storage tiers 102 and 104 is migrated between multiple storage tiers as necessary to facilitate achievement of desired performance levels. For example, in the FIG. 1 embodiment, the data mover modules 106 may migrate data between multiple storage tiers of the front-end and back-end storage tiers in order to achieve desired levels of IO performance responsive to requests received from one or more clients. Data migration and other data movement determinations may be based at least in part on monitoring of current levels of performance within the system 100. Such monitoring in the FIG. 1 embodiment is assumed to be performed under the direction of a front-end file system and may involve the use of sensors of a sensor network, or various other types of monitoring arrangements. The particular types of operating conditions and other factors that are monitored can be varied depending upon the needs of a given implementation.

The movement of a given data file, data object or other set of data between first and second storage tiers may be controlled at least in part based on information provided by a client running on or otherwise associated with a corresponding compute node.

When PLFS is used to implement the data mover modules 106, each data mover module illustratively comprises PLFS middleware including multiple synchronization daemons associated with respective OSSs of at least one of the storage tiers. A given such synchronization daemon is triggered by at least one of a read operation and a write operation associated with a client comprising an application running on a corresponding compute node.

Metadata associated with moved data is updated to reflect the movement between storage tiers. In the FIG. 1 embodiment, the updating of such metadata is assumed to be performed at least in part under the control of the data mover modules 106 and the resulting updated metadata is stored in the metadata warehouse 120.

If the desired levels of performance have not been achieved, the manner in which the data is stored across the front-end and back-end storage tiers 102 and 104 can be altered. In the context of the FIG. 1 embodiment, this generally involves the data mover modules 106 executing an alternative storage arrangement, possibly responsive to information received via HSM APIs, so as to facilitate achievement of the desired levels of performance in the system 100.

If the desired levels have been achieved, the data mover modules 106 continue to control the flow of data between the front-end and back-end storage tiers. The above-noted determination as to whether or not desired levels of performance have been achieved is then repeated periodically and further adjustment of the manner in which the data are distributed over the front-end and back-end storage tiers 102 and 104 is made by the data mover modules 106 as needed, possibly in response to changing operating conditions and other factors.

As mentioned previously, in some embodiments an HSM quota manager may be used to manage both back-end user quotas and archive directory quotas, although in other embodiments, for example, such a quota manager may be configured to manage only back-end user quotas or only archive directory quotas. As a more particular example, the quota manager can establish back-end user quotas identifying corresponding portions of a back-end file system available to respective users. In the FIG. 1 embodiment, the users may correspond to respective ones of the compute nodes 108 of the HPC 107.

The archiving of data between a front-end file system and a back-end file system may be controlled based at least in part on the established user quotas. For example, in the FIG. 1 embodiment, the archiving of data may be controlled based at least in part on the established user quotas, with the data mover modules 106 enforcing the respective user quotas for their corresponding users. Moreover, the archive directories can be configured for respective ones of the users, and a given file from a front-end storage tier 102 can be archived in a back-end storage tier 104 responsive to a link to that file being stored in a corresponding one of the archive directories of a front-end file system.

Figure 2:
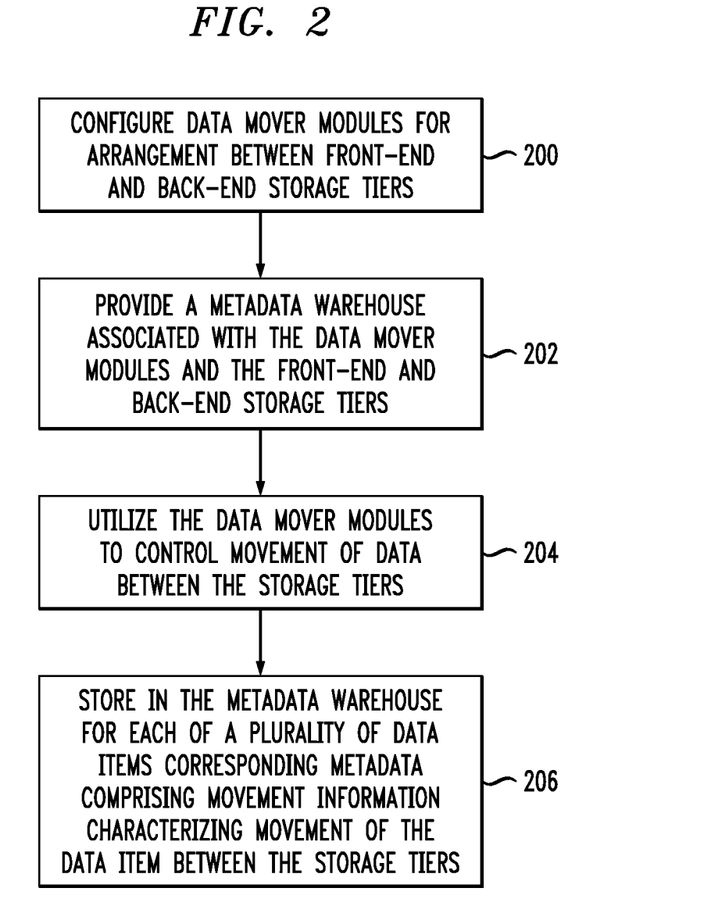
FIG. 2 is a flow diagram of an exemplary process implemented using the metadata warehouse in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations involving one or more data mover modules arranged between at least one front-end storage tier and at least one back-end storage tier and having an associated metadata warehouse. For example, the ordering of the process steps may be varied in other embodiments, or certain steps may be performed concurrently with one another rather than serially. Also, one or more of the process steps may be repeated periodically for different processing applications, or performed in parallel with one another.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Another illustrative embodiment will now be described in more detail with reference to FIG. 3. In this embodiment, an information processing system 300 comprises a plurality of front-end storage tiers 302 and a plurality of back-end storage tiers 304. A plurality of data mover modules 306 implemented as respective data movers (DMs) are arranged between the front-end and back-end storage tiers 302 and 304.

The front-end storage tiers 302 illustratively comprise a first storage tier 302-1 implemented utilizing Lustre and GPFS and a second storage tier 302-2 implemented using a plurality of Isilon® platform nodes. The first and second storage tiers 302-1 and 302-2 may comprise respective separate and distinct front-end file systems of the system 300. For example, at least the first storage tier 302-1 in the present embodiment is illustratively associated with a cluster file system.

The back-end storage tiers 304 more particularly comprise first through fourth storage tiers 304-1, 304-2, 304-3 and 304-4. The first through fourth storage tiers 304-1, 304-2, 304-3 and 304-4 are respectively implemented as an Isilon® scale-out NAS cluster, an object storage tier comprising a combination of Atmos object-based storage and ViPR® Software-Defined Storage (SD S) both also commercially available from EMC Corporation, a cloud storage tier, and a tape system. The first through fourth back-end storage tiers 304-1 through 304-4 may comprise respective separate and distinct back-end file systems of the system 300. Alternatively, multiple such tiers can share a common file system.

Numerous alternative arrangements of one or more front-end storage tiers and one or more back-end storage tiers can be used in other embodiments. The front-end and back-end file system configurations can also be varied, as indicated previously.

The system 300 further comprises a bus 310 for communicating events, messages and other information between system components.

A data warehouse 320, event database 322 and policy engine 324 are coupled to the bus 310. The policy engine 324 in this embodiment in addition to implementing policies controls scheduling of at least a portion of the data movement that is carried out between pairs of storage tiers of the front-end and back-end storage tiers 302 and 304.

The first storage tier 302-1 of the front-end storage tiers 302 is coupled to the bus 310 via multiple data APIs 330 that also interface to corresponding ones of the data mover modules 306. The first storage tier 302-1 is also coupled to the bus 310 via an event API 332.

Similarly, the second storage tier 302-2 of the front-end storage tiers 302 is coupled to the bus 310 via a data API 334 that also interfaces to corresponding ones of the data mover modules 306. The second storage tier 302-2 is also coupled to the bus 310 via an event API 336.

Figure 3:
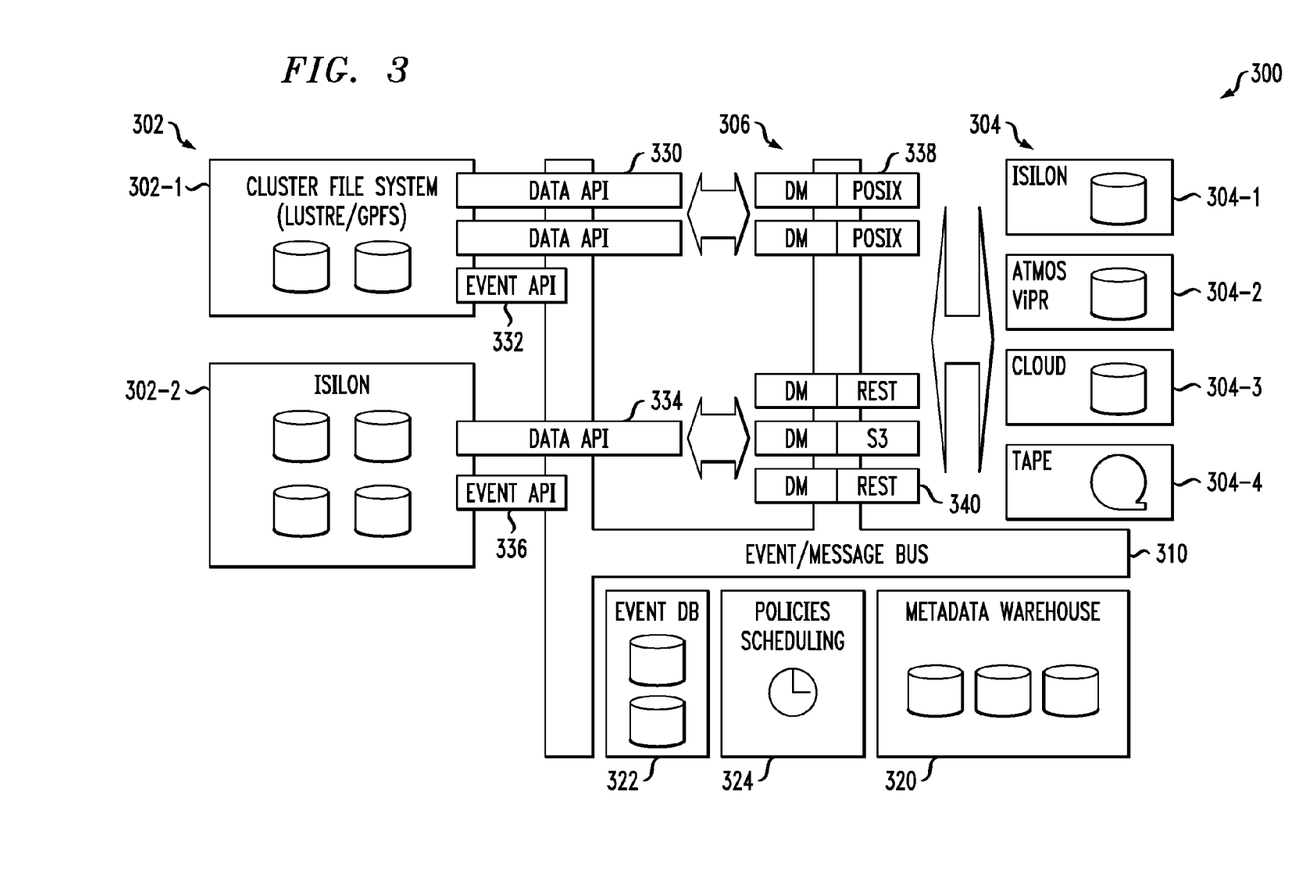
FIG. 3 shows another embodiment of an information processing system comprising front-end and back-end storage tiers, data mover modules and an associated metadata warehouse.

Data movement in the FIG. 3 embodiment is performed by the data mover modules 306. These data mover modules are controlled at least in part by the policy engine 324 based on events captured in the event database 322.

Certain ones of the data mover modules 306 communicate with one or more of the back-end storage tiers 304 via POSIX interfaces 338. Other data mover modules 306 communicate with one or more of the back-end storage tiers 304 via one or more RESTful interfaces 340. Still other data mover modules 306 can communicate with one or more of the back-end storage tiers 304 via other types of interfaces, illustratively including an S3 interface in an implementation in which cloud storage tier 304-3 comprises Amazon S3 cloud storage, where S3 denotes the Simple Storage Service commercially available from Amazon.

It should also be noted that a given data mover module 306 can be configured with multiple interfaces so as to be able to communicate with multiple ones of the individual storage tiers of the back-end file storage tiers 304.

The system 300 may further comprise an HSM quota manager, although such a component is not explicitly shown in the figure. Such a quota manager can operate in a manner similar to the quota manager previously described in the context of FIG. 1. By way of example, a quota manager of this type if present in the FIG. 3 embodiment may be part of the policy engine 324 or a related system component.

In the FIG. 3 embodiment, the event database 322 is illustratively configured to collect information relating to multiple actions taken on a given data item starting from its creation in a front-end file system associated with at least one of the front-end storage tiers 302. Such information can include, for example, creation time, modification time and rename operations, as well as HSM backup or restore operations involving any of the storage tiers. Notifications for these and other events can be collected from the front-end and back-end storage tiers of the system 300 using a common event enabler (CEE) and inserted into the event database 322. This may involve use of the Advanced Message Queuing Protocol (AMQP) and associated open source message broker software such as RabbitMQ available from Pivotal Software, Inc.

The event database 322 is accessed by the policy engine 324 via the bus 310. Any relevant metadata associated with a given data item is collected within the system 300 and stored in the metadata warehouse 320. By way of example, any event relating to a data item stored in one of the storage tiers 302 or 304 can lead to corresponding metadata being generated and stored in the metadata warehouse 320. Such events can include file system operations such as creation, access, modification and renaming of the data item.

The metadata generated and stored in the metadata warehouse 320 responsive to such events can include location, timestamp and checksum for each of a plurality of different stages of movement of the data item between storage tiers 302 and 304 in the system. Additional examples of metadata that can be collected and stored for a given data item include information value of the data item as well as any regulatory constraints regarding the data item, statistics on the data item such as access frequency and length of access from open to close, as well as the risk of the data item being corrupted or otherwise tampered with. Information value of the data item can be used to indicate that the data item is needed for further analysis or can specify a retention time for the data item after which the data item will be deleted by the system. The tampering risk can be utilized by the policy engine 324 to determine an appropriate number and placement of copies of the data item in the available storage tiers.

Still further examples of metadata that can be generated and stored in the metadata warehouse 320 for a given data item include compliance attributes as well as accuracy of the data item.

For these and other types of metadata stored in the metadata warehouse 320, the metadata can be enhanced or otherwise updated each time the corresponding data item is processed by a given system component. Additional information that can be collected as part of the metadata includes the type of applications that are utilizing the data item.

As mentioned previously, as the size of a given data item can increase to tens of terabytes (TB) or more, it may be necessary to split the data item into sub-items that are separately stored in one or more of the storage tiers. In such an arrangement, the metadata stored for the given data item can include checksums for the entire data item as well as for each of the sub-items. This arrangement can be used to ensure, for example, that the system can determine the particular tier in which corruption or other tampering with a given sub-item occurred.

The FIG. 3 embodiment advantageously allows users to implement a wide variety of different types of storage media for backup and archive functionality including several distinct storage products such as Isilon® scale-out NAS clusters, Atmos/ViPR® object storage, Amazon S3 cloud storage and tape storage. By way of example, an Isilon® scale-out NAS cluster storage tier can be used as a "warm" archive tier, an Atmos/ViPR® object storage tier as a "cold" archive tier, and an Amazon S3 cloud storage tier for long-term storage and compliance. Of course, these particular storage systems and their configurations as particular tiers are an example for purposes of illustration only, and should not be construed as limiting in any way.

Management of multiple copies of files, objects or other data items across multiple storage tiers is considerably facilitated through use of the metadata warehouse 320 and its associated event database 322 and policy engine 324. For example, the data warehouse 320 through its stored metadata can reliably and efficiently keep track of the life cycle of each data item including the lineage of that data item as well as additional information such as checksums and attributes of the data item.

The metadata warehouse 320 in the FIG. 3 embodiment can be used to support a wide variety of additional or alternative functionality. For example, the stored metadata can be used to provide versioned copies of a given data item to multiple storage tiers in accordance with a specified policy. Other examples of functionality supported by the metadata warehouse 320 include disaster recovery or other types of restoration from archive or backup tiers, consistency check after restoration, rebalancing of the storage tiers based on access statistics, structured query language (SQL) access to the metadata for queries relating to lineage of a data item, reporting and accounting based on the metadata, and web-based console support for centralized management of the system.

It should be understood that the particular front-end and back-end storage tier arrangements and other system components as illustrated in FIG. 3 are presented by way of illustrative example only, and should not be construed as limiting in any way.

The embodiment of FIG. 3 may be viewed as an exemplary arrangement in which data mover modules are implemented as respective parallel data movers each controlling movement of data between front-end and back-end storage tiers, possibly based on information received via corresponding HSM APIs, with associated movement information being stored as metadata in a metadata warehouse.

Numerous alternative configurations of an information processing system comprising front-end and back-end storage tiers and associated file systems, data mover modules and a metadata warehouse can be configured in other embodiments.

A number of examples of more particular implementations of information processing systems with metadata warehouses similar to those of the illustrative embodiments of FIGS. 1 and 3 will now be described.

Example 1

A simulation application running on an HPC generates a 40 TB file that needs to be backed up from a Lustre PFS storage tier to an Isilon® scale-out NAS cluster storage tier. The file is scheduled to be moved to the Isilon® scale-out NAS cluster storage tier by a data mover module two hours after its last access. The file access is recorded in a Lustre changelog and sent to a RabbitMQ server which causes the access event to be recorded in an event database. A policy engine receives the event and each hour checks the metadata in a metadata warehouse to determine if the file was accessed. One hour later the file is ready to be moved to the Isilon® scale-out NAS cluster storage tier. However, as the file size is too large for the 4 TB Isilon® file size limitation, the file is first split into ten sub-files of 4 TB each. The data mover module will move ten sub-files to the Isilon® scale-out NAS cluster storage tier and in conjunction with the transfer will compute the checksum for the full file as well as for its sub-files. Additional metadata such as the time of transfer completion and identifiers of the tiers involved is generated and stored in the metadata warehouse. The data mover module deletes the file from the Lustre PFS and replaces it with a corresponding stub indicating the new location of the file.

The policy for this file further indicates that the file is to be moved to a "cold" Atmos/ViPR® object storage tier after a day and that the movement will apply to all ten of the sub-files. When the day passes, the data mover module moves the ten sub-files to the Atmos/ViPR® object storage tier as ten respective objects using RESTful operations and at the end of the transfer it calculates checksums for all ten of the sub-files and adds the results to the metadata stored for the file in the metadata warehouse. Assuming that the file has only low informational value and is non-critical, after a week the file can be moved as a copy to an Amazon S3 cloud storage tier while a copy is maintained in the Atmos/ViPR® object storage tier for another week.

Prior to the expiration of the second week, a data analysis application running on the HPC requests access to the file on the Isilon® scale-out NAS cluster storage tier to run an analysis job that can be split into ten streams, one for each sub-file. The data mover module transfers the sub-files from the Atmos/ViPR® object storage tier in order to allow the data analysis job to be run. Alternatively, the file could be analyzed in the Atmos/ViPR® object storage tier as a Hadoop job. Before the analysis application starts and before the stub on the Isilon® scale-out NAS cluster storage tier is replaced with the actual file, a checksum is calculated for each of the sub-files and compared to the respective checksums previously stored as part of the file metadata in the metadata warehouse. If the checksum of one of the sub-files does not match the corresponding previously-stored checksum, an error message is sent to the application that is trying to access the specific sub-file on the Isilon® scale-out NAS cluster storage tier but the other sub-files are successfully analyzed. As there is a copy of the file in the Amazon S3 cloud storage tier, the policy engine will check if the checksum of that copy is correct and if the checksum is correct will bring the file to the Isilon® scale-out NAS cluster storage tier directly without bringing it first to the Atmos/ViPR® object storage tier.

Example 2

Assume that the data file from Example 1 is accessed from the Lustre PFS after more than two weeks. The metadata of the file in the metadata warehouse will show that the only copy of the file is in the Amazon S3 cloud storage tier. There is a chain of stubs in the Luster PFS, Isilon® scale-out NAS cluster and Atmos/ViPR® object storage tiers with the latter stub pointing to the Amazon S3 cloud storage tier. The data mover module will check the source and the destination and bring the file from the Amazon S3 cloud storage tier into the Lustre PFS while removing the stubs in the Isilon® scale-out NAS cluster and Atmos/ViPR® object storage tiers. In conjunction with this transfer, the data mover module calculates a checksum for the file and compares it to the previously-stored checksum in the metadata stored in the metadata warehouse. If the checksum does not match, an error message is generated and sent to the accessing user. The metadata is queried to determine the last known creation time of a good copy of the file. If the file has a high informational value, a copy may be maintained in the Atmos/ViPR® object storage tier for redundancy.

Example 3

A file containing sensitive vendor-proprietary information is written to the Lustre PFS and it is marked as sensitive but not confidential. As before, after an hour the file will be moved to the Isilon® scale-out NAS cluster storage tier according to the appropriate policy after checking that the cluster location is not blacklisted. After a week the file will be moved to the Atmos/ViPR® object storage tier after checking that the Atmos/ViPR® object storage tier is in a location allowed for sensitive private information. The policy engine will know that the file cannot be moved to a public cloud and will therefore prevent the data mover module from moving the file to the Amazon S3 cloud storage tier because the location of the Amazon S3 cloud storage tier is unknown or it is in a different country conflicting with regulations for sensitive private information. This preventative action is made possible by the fact that the metadata stored for the file in the metadata warehouse indicates the sensitivity of the file.

The foregoing examples are illustrative only, and should not be viewed as limiting the scope of any particular embodiment in any way.

Illustrative embodiments provide a number of significant advantages relative to conventional arrangements. For example, one or more such embodiments can reduce the costs associated with archiving, backup, restoration and other types of movement of data while ensuring a high level of confidence in data validation by providing an ability to detect potential data integrity issues such as data corruption or data tampering. The use of a metadata warehouse in a given embodiment provides a globally-accessible location for metadata relating to a given data item that may have multiple copies stored in respective distinct storage tiers. Also, the closest available copy can be easily determined and provided to a requesting entity without the need to traverse an entire hierarchy of data item stubs through a chain of storage tiers.

In one or more embodiments, the metadata stored in the metadata warehouse allows data item corruption or other tampering to be detected before a given retrieved data item is provided to a requesting application or other system entity. This allows remedial action to be taken in an efficient and effective manner by, for example, providing a copy of a data file from another storage tier responsive to detection of corruption or tampering. In addition, the particular tier in which the corruption or tampering occurred can be easily identified.

Moreover, the use of metadata stored in the metadata warehouse can facilitate the recovery of a given data item from the "closest" storage tier to a given requesting entity in situations in which different copies of the data item reside on different storage tiers.

In some embodiments, the metadata stored in the metadata warehouse is utilized to ensure that compliance requirements are met. For example, some data items corresponding to particularly valuable information assets may not be suitable for storage in a public cloud or in particular blacklisted countries. Metadata identifying the informational value of a given data item as well as any compliance or regulatory constraints can be used in these embodiments to ensure that the data item is only stored in appropriate storage tiers. These and other requirements for a given data item can be enforced via policies implemented by a policy engine utilizing metadata stored in the metadata warehouse.

Accordingly, illustrative embodiments can be configured to allow close control and monitoring of the malicious activities on files, objects and other data items in a multi-tier HSM storage solution. It will allow detection of data corruption due to software errors, malicious tampering with the data or data loss in the public cloud. It will also allow detection of the time and location of a data corruption event utilizing the checksums stored after each data movement to a different tier.

It is apparent from the foregoing that the disclosed arrangements can be used to construct a high-performance storage system using any desired arrangement of front-end and back-end storage tiers. Moreover, the use of data mover modules in conjunction with a metadata warehouse and associated front-end and back-end file systems significantly expands the number and type of HSM targets that may be used, thereby substantially improving system flexibility.

Illustrative embodiments disclosed herein also make it possible to dynamically balance the conflicting requirements of storage capacity and IO throughput, thereby avoiding situations in which either performance is less than optimal or the costs of implementing the system become excessive. Arrangements of this type can provide further acceleration of IO operations in the systems 100 and 300, leading to enhanced system performance relative to conventional arrangements, while additionally or alternatively providing an ability to achieve particular levels of performance at lower cost.

It is to be appreciated that the particular processing device arrangements and associated storage functionality illustrated in FIGS. 1-3 are exemplary only, and numerous other arrangements may be used in other embodiments.

For example, the disclosed techniques may be adapted in a straightforward manner for providing efficient access to data distributed over many different types of distinct types of storage tiers, including a wide variety of storage tiers other than the particular types of storage tiers described in conjunction with the embodiments of FIGS. 1 and 3.

It was noted above that portions of the information processing system 100 may be implemented using one or more processing platforms. Illustrative embodiments of such platforms will now be described in greater detail. Although described in the context of system 100, these platforms may also be used to implement at least portions of the information processing system of FIG. 3, as well as other information processing systems in other embodiments of the invention.

Figure 4:
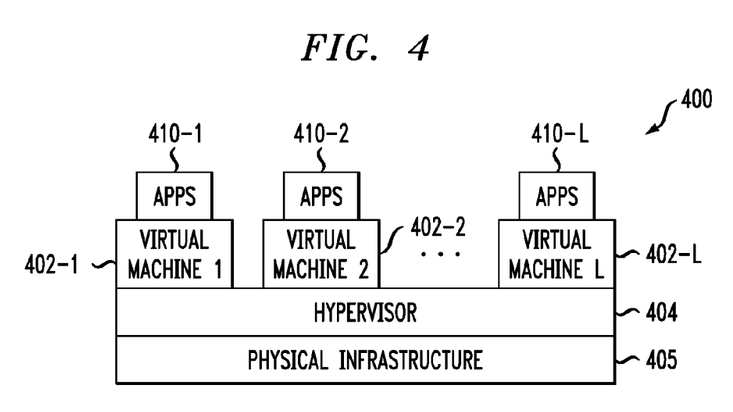
FIGS. 4 and 5 show examples of processing platforms that may be utilized to implement at least a portion of each of the systems of FIGS. 1 and 3.
Figure 5:
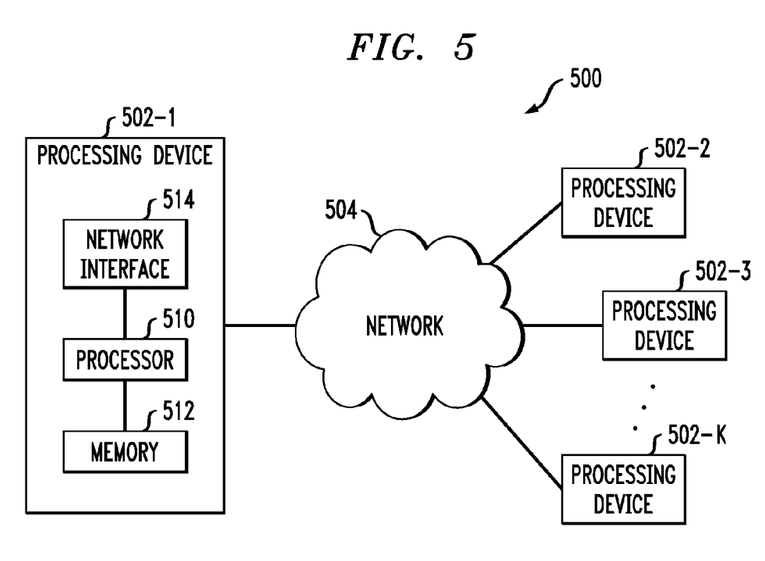

As shown in FIG. 4, portions of the information processing system 100 may comprise cloud infrastructure 400. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, such as container-based virtualization infrastructure using Docker containers or other types of containers, in place of or in addition to virtualization infrastructure comprising virtual machines.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a data mover module or an associated front-end or back-end file system as disclosed herein can be implemented at least in part in the form of one or more software programs stored in memory and executed by a processor of a processing device such as one of the virtual machines 402 or one of the processing devices 502. For example, the data mover modules 106 and the policy engine 124 in the FIG. 1 embodiment are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems, storage tiers, file systems and computer systems that can benefit from the enhanced flexibility provided in hierarchical storage management. Also, the particular configurations of system and device elements shown in FIGS. 1 and 3-5 and the process operations shown in FIG. 2 can be varied in other embodiments. Thus, for example, the particular type of front-end storage tiers, data mover modules, metadata warehouses and back-end storage tiers deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a plurality of front-end storage tiers;
   a plurality of back-end storage tiers;
   a plurality of data mover modules arranged between the front-end and back-end storage tiers and configured to control movement of data between the storage tiers; and
   a metadata warehouse associated with the data mover modules and the front-end and back-end storage tiers;
   the metadata warehouse being configured to store for each of a plurality of data items corresponding metadata comprising movement information characterizing movement of the data item between the storage tiers;
   wherein the metadata warehouse further stores for each of the plurality of data items corresponding checksum information utilizable to detect tampering with the data item and additional information sufficient to identify a particular one of the storage tiers associated with any such detected tampering;
   wherein in conjunction with movement of a given one of the data items from a first one of the storage tiers to a second one of the storage tiers the given data item in the first one of the storage tiers is replaced with a stub pointing to metadata stored for the given data item in the metadata warehouse; and
   wherein the apparatus is implemented using at least one processing device comprising a processor coupled to a memory.

2. The apparatus of claim 1 wherein at least one of the data mover modules communicates with one of the storage tiers via a POSIX interface and at least one of the data mover modules communicates with one of the storage tiers via a RESTful interface.

3. The apparatus of claim 1 further comprising an event database configured to store information relating to events involving the plurality of data items wherein said events comprise one or more of creating the data item, accessing the data item, moving the data item, modifying the data item, renaming the data item, backing up the data item, archiving the data item and restoring the data item.

4. The apparatus of claim 3 wherein at least a portion of the metadata stored for a given one of the data items comprises information derived at least in part from one or more events stored for that data item in the event database.

5. The apparatus of claim 1 further comprising a policy engine associated with the data mover modules and specifying one or more policies relating to movement of the data items between the storage tiers.

6. The apparatus of claim 1 wherein the metadata warehouse further stores for each of the plurality of data items one or more of:
   lineage information for that data item;
   access history information for that data item; and
   compliance information for that data item.

7. The apparatus of claim 6 wherein the lineage information for a given one of the data items comprises actions taken on the given data item from its creation.

8. The apparatus of claim 6 wherein the access history information for a given one of the data items comprises access statistics for the given data item within multiple ones of the storage tiers.

9. The apparatus of claim 6 wherein the compliance information for a given one of the data items comprises regulatory constraints on location of the data item within multiple ones of the storage tiers.

10. The apparatus of claim 1 wherein the metadata warehouse is utilized by one or more of the data mover modules to identify relative to specified access point a closest location of a given one of the data items from among a plurality of locations of respective copies of the given data item within respective ones of the storage tiers.

11. The apparatus of claim 1 wherein the movement information for a given one of the data items comprises at least a subset of one or more locations, one or more timestamps and one or more checksums for each of a plurality of stages of movement of the given data item between respective pairs of the storage tiers.

12. An information processing system comprising the apparatus of claim 1.

13. An apparatus comprising:
   a plurality of front-end storage tiers;
   a plurality of back-end storage tiers;
   a plurality of data mover modules arranged between the front-end and back-end storage tiers and configured to control movement of data between the storage tiers; and
   a metadata warehouse associated with the data mover modules and the front-end and back-end storage tiers;
   the metadata warehouse being configured to store for each of a plurality of data items corresponding metadata comprising movement information characterizing movement of the data item between the storage tiers;
   wherein the metadata warehouse further stores for each of the plurality of data items corresponding checksum information utilizable to detect tampering with the data item and additional information sufficient to identify a particular one of the storage tiers associated with any such detected tampering;

wherein a given one of the data items is split into a plurality of sub-items for storage in one or more of the storage tiers and further wherein the checksum information comprises checksum information for the given data item in its entirety and separate checksum information for each of the sub-items of the given data item; and wherein the apparatus is implemented using at least one processing device comprising a processor coupled to a memory.

14. A method comprising:

configuring a plurality of data mover modules for arrangement between a plurality of front-end storage tiers and a plurality of back-end storage tiers;

providing a metadata warehouse associated with the data mover modules and the front-end and back-end storage tiers;

utilizing the data mover modules to control movement of data between the storage tiers; and storing in the metadata warehouse for each of a plurality of data items corresponding metadata comprising movement information characterizing movement of the data item between the storage tiers, corresponding checksum information utilizable to detect tampering with the data item and additional information sufficient to identify a particular one of the storage tiers associated with any such detected tampering;

wherein in conjunction with movement of a given one of the data items from a first one of the storage tiers to a second one of the storage tiers the given data item in the first one of the storage tiers is replaced with a stub pointing to metadata stored for the given data item in the metadata warehouse; and wherein the configuring, providing, utilizing and storing are implemented using at least one processing device comprising a processor coupled to a memory.

15. The method of claim 14 further comprising:

storing in an event database information relating to events involving the plurality of data items; and generating at least a portion of the metadata stored in the metadata warehouse for a given one of the data items utilizing information derived from one or more of said events associated with the given data item;

wherein for the given data item said associated events comprise one or more of creating the data item, accessing the data item, moving the data item, modifying the data item, renaming the data item, backing up the data item, archiving the data item and restoring the data item.

16. The method of claim 14 wherein the movement information for a given one of the data items comprises at least a subset of one or more locations, one or more timestamps and one or more checksums for each of a plurality of stages of movement of the given data item between respective pairs of the storage tiers.

17. The method of claim 14 wherein a given one of the data items is split into a plurality of sub-items for storage in one or more of the storage tiers and further wherein the checksum information comprises checksum information for the given data item in its entirety and separate checksum information for each of the sub-items of the given data item.

18. A non-transitory processor-readable storage medium having stored therein program code of one or more software programs, wherein the program code when executed by at least one processing device causes said processing device:

to configure a plurality of data mover modules for arrangement between a plurality of front-end storage tiers and a plurality of back-end storage tiers;

to provide a metadata warehouse associated with the data mover modules and the front-end and back-end storage tiers;

to utilize the data mover modules to control movement of data between the storage tiers; and to store in the metadata warehouse for each of a plurality of data items corresponding metadata comprising movement information characterizing movement of the data item between the storage tiers, corresponding checksum information utilizable to detect tampering with the data item and additional information sufficient to identify a particular one of the storage tiers associated with any such detected tampering;

wherein in conjunction with movement of a given one of the data items from a first one of the storage tiers to a second one of the storage tiers the given data item in the first one of the storage tiers is replaced with a stub pointing to metadata stored for the given data item in the metadata warehouse.

19. The processor-readable storage medium of claim 18 wherein the storage medium comprises at least one of an electronic memory and a storage disk.

20. The processor-readable storage medium of claim 18 wherein a given one of the data items is split into a plurality of sub-items for storage in one or more of the storage tiers and further wherein the checksum information comprises checksum information for the given data item in its entirety and separate checksum information for each of the sub-items of the given data item.

* * * * *